Patented June 26, 1945

2,379,309

UNITED STATES PATENT OFFICE 2,379,309

MANUFACTURE OF DICARBOXYLIC ACID ESTERS OF HIGH POLYMER POLYHYDROXY COMPOUNDS

Carl J. Malm and La Moyne D. Bearden, Rochester, N. Y., assignors to Eastman Kodak Company, Rochester, N. Y., a corporation of New Jersey No Drawing. Application March 28, 1942, Serial No. 436,718

6 Claims. (Cl. 260—225)

This invention relates to the preparation of dicarboxylic acid esters of high polymer polyhydroxy compounds, in which dilution is desirable before the precipitation step, in which trisodium phosphate is added, thus enabling dilution with water.

The dicarboxylic acid esters of high polymer polyhydroxy compounds are ordinarily prepared by treating either the polyhydroxy compound on an ester or ether thereof, having free and esterifiable hydroxyl groups, with a dicarboxylic acid anhydride under esterifying conditions. This esterification may be accompanied by the use of a tertiary organic base with or without a solvent, as shown in U. S. Patent No. 2,093,464, or in Fordyce and Emerson application Serial No. 325,191, filed March 21, 1940. On the other hand, the ester may be prepared by using a solvent and employing an elevated temperature using an ester or ether of the polyhydroxy compound as the starting material. In other cases esters of this nature may be prepared by melting together the dicarboxylic acid anhydride and the hydroxy compound.

In those prior processes either the pyridine, the solvent or their mixture were employed in large or excessive amount, as compared to that necessary to promote the reaction, or else it was necessary to dilute the reaction mass with an organic solvent prior to its precipitation in order to obtain a finely divided readily worked precipitate and thereby assure the success of that separation step. The cost of the process was increased in any case because of the large proportion of solvent or pyridine employed.

In the making of the dicarboxylic acid esters of these polyhydroxy compounds, it is desirable to employ a minimum of solvent or pyridine or both, as this makes for economy and also increases the concentration of anhydride in the esterification mixture. However, by thus decreasing the amount of liquid in the reaction mass, it is necessary to dilute it prior to precipitation. This may be done with an organic solvent but the economy achieved by restricting the use of solvent in the esterification is cancelled by this further use of solvent. As the use of solvent without pyridine or a restricted amount of pyridine results in an ester which is insoluble in water, water dilution would result in precipitation of the ester. The ester may be rendered soluble in water by adding trisodium phosphate to the completed esterification mass, whereupon the mass may be diluted to a thin consistency thereby facilitating the precipitation of the ester.

Our invention is directed both to processes of preparing dicarboxylic acid esters of polyhydroxy compounds in which a restricted proportion of pyridine is employed and those in which pyridine is omitted entirely. For example, it has been found that, in the manufacture of dicarboxylic acid esters of high polymer polyhydroxy compounds such as cellulose acetate phthalate, polyvinyl phthalate and the like, the amount of pyridine employed may be less than that which would combine with all of the carboxyl groups in the reaction mixture, providing a suitable auxiliary solvent is used and the reaction proceeds satisfactorily. The restricted proportion of pyridine results in a product which is insoluble in water and to recover the product either the completed reaction mass should be diluted with an organic solvent or the product should be rendered water soluble and the mass is then diluted with water before the precipitation.

In some processes of making dicarboxylic acid esters of high polymer polyhydroxy compounds, the pyridine is omitted entirely. For instance, Hiatt and Emerson Patent No. 2,352,261, describes a method of making such esters in which the dicarboxylic acid anhydride and the hydroxy compound are melted together. In such a process, in accordance with our invention, the completed reaction mass is diluted with an aqueous solution of trisodium phosphate and the product can then be separated from the mass by precipitating in dilute acid.

In some processes of making dicarboxylic acid esters of high polymer polyhydroxy compounds, the polyhydroxy compound is reacted with the anhydride of the dicarboxylic acid in an organic solvent containing a small proportion of water, using an elevated temperature as described in U. S. patents, No. 2,183,982 of Blanchard and Crane and No. 2,275,685 of Martin Salo. The products resulting from processes of that type are insoluble in water but soluble in organic solvents and heretofore either the amount of solvent employed in the esterification made dilution unnecessary before precipitation or an organic solvent was added to the completed reaction mass to facilitate that operation. In accordance with our invention the completed reaction mass is diluted with an aqueous solution of trisodium phosphate to impart to the mass a suitably low viscosity for precipitation.

After dilution of the completed reaction mass, in accordance with our invention, the precipitation is carried out by pouring the mass with agitation into water containing a small proportion of mineral acid, such as an aqueous solution of hydrochloric, sulfuric or phosphoric acid of 5% effective concentration.

In its broadest aspects, our invention comprises adding trisodium phosphate to the completed reaction mixture in an amount sufficient to neutralize all of the free carboxyls therein. This applies to processes for making cellulose acetate phthalate, cellulose phthalate, polyvinyl phthalate, cellulose acetate succinate, or in general, acid dicarboxylic acid esters of high polymer polyhydroxy compounds. We have found that a 10% solution of trisodium phosphate in water is quite satisfactory for imparting water solubility to the ester without hydrolyzing it or causing excessive foaming as might be caused by the use of sodium hydroxide or sodium carbonate. After the addition of the trisodium phosphate to the completed reaction mixture, water as a diluent may be added until the mass has the desired viscosity. Obviously when a high viscosity ester is prepared, more dilution would be desirable than with a low viscosity ester.

The following examples illustrate our invention:

Example I 50 pounds of a hydrolyzed cellulose acetate containing 33.5% acetyl was dissolved in a mixture of 50 pounds of pyridine and 50 pounds of methyl ethyl ketone. 50 pounds of phthalic anhydride was added thereto and the mass was stirred and kept at a temperature of approximately 180° F. for two and one-half hours. The mass was cooled to 145° F. and 54 pounds of acetone were added thereto. The mass was then cooled to room temperature and 120 pounds of 10% trisodium phosphate was added slowly with stirring. The mass was then diluted with 60 pounds of distilled water and 12 gallons of the mass was precipitated into 80 gallons of distilled water to which five pounds of 95% sulfuric acid had been added. The product was thoroughly washed and dried. The resulting product was a cellulose acetate phthalate having a phthalyl content of 30.0%.

Example II 75 pounds of cellulose acetate, containing 38.5% acetyl and free and esterifiable hydroxyl groups, was thoroughly mixed in an autoclave with 75 pounds of methyl ethyl ketone, 75 pounds of phthalic anhydride and seven pounds of distilled water. The mass was heated and mixed together for five hours. The heating consisted of raising the temperature to 300° F. gradually during the first three hours and then maintaining at 300° F. for the remainder of the time. The mixture was then cooled to 130° F. 120 pounds of a solution of trisodium phosphate in water of 10% concentration was added to the mass which was warmed to 100° F. and stirred for 10 minutes. Six gallons of the mixture was precipitated into 110 gallons of water to which five pounds of sulfuric acid had been added. The mass was thoroughly washed and dried. A cellulose acetate phthalate containing 22% phthalyl was obtained.

Example III 450 grams of phthalic anhydride was mixed with 480 grams of methyl ethyl ketone and 270 grams of pyridine for one hour at approximately 130° F. 150 grams of polyvinyl alcohol was added and the reaction was carried out at 220° F. for five hours. The mass was then cooled to 160–180° F. and was diluted with four pounds of a 10% solution of trisodium phosphate in water. The mass was then diluted further with 1500 grams of distilled water and was precipitated into 10 gallons of water containing 1135 grams of sulfuric acid. The ester was thoroughly washed and dried. A polyvinyl phthalate containing 68% phthalyl resulted.

In precipitating the dicarboxylic acid ester in aqueous acid, the acid should be present in the precipitating bath in such amount that it remains acid thruout the precipitation. For instance if an amount of sodium phosphate greater than necessary has been employed in the diluting step more acid than ordinarily necessary should be employed in the precipitating bath to compensate therefor. Altho' our invention has been described using trisodium phosphate, disodium or monosodium phosphates can be used, the amount of the former required being 1½ times that of trisodium phosphate while the amount of the latter required is 3 times the preferred trisodium compound. Trisodium phosphate proves to be the most economical of any of the phosphates which can be employed.

What we claim as new and desire to secure by Letters Patent of the United States is:

1. A process for the manufacturing of a dicarboxylic acid ester of cellulose which comprises reacting upon a cellulose acetate having free and esterifiable hydroxyl groups with a dicarboxylic acid anhydride in which any pyridine present is in an amount substantially less than that which will combine with the carboxyls present in the cellulose ester formed, then adding trisodium phosphate to the mass in an amount at least sufficient to neutralize the free carboxyl groups of the ester formed and subsequently separating the ester by mixing the mass with a precipitating liquid essentially consisting of an aqueous solution of a mineral acid, the precipitating bath being acid throughout the precipitation.

2. A method of manufacturing cellulose acetate phthalate which comprises reacting cellulose acetate having free and esterifiable hydroxyl groups with phthalic anhydride in which any pyridine present is in an amount substantially less than will combine with the carboxyl groups of the cellulose ester formed, after the esterification is completed adding trisodium phosphate to the mass in an amount sufficient to neutralize the free carboxyl groups of the ester formed and subsequently separating the ester from the mass by mixing with a precipitating liquid essentially consisting of water and a mineral acid, the precipitating bath being maintained acid throughout the precipitation.

3. A method of manufacturing cellulose acetate phthalate which comprises reacting cellulose acetate having free and esterifiable hydroxyl groups with phthalic anhydride, the esterification mass being substantially free of pyridine, adding trisodium phosphate to the completed reaction mass in an amount sufficient to neutralize the free carboxyl groups of the ester and subsequently separating the ester from the mass by mixing with a precipitating liquid essentially consisting of water and a mineral acid, the precipitating bath being maintained acid throughout the precipitation.

4. A process for the manufacture of a dicarboxylic acid ester of cellulose which comprises reacting upon a cellulose acetate having an acetyl content of 38.5 per cent and free and esterifiable hydroxyl groups with a dicarboxylic acid anhydride in which any pyridine present is in an amount substantially less than that which will combine with the carboxyls present in the cellulose ester formed, then adding trisodium phosphate to the mass in an amount at least sufficient to neutralize the free carboxyl groups of the ester formed and subsequently separating the ester by mixing the mass with a precipitating liquid essentially consisting of an aqueous solution of a mineral acid, the precipitating bath being acid throughout the precipitation.

5. A process for the manufacture of cellulose acetate phthalate which comprises reacting cellulose acetate having free and esterifiable groups with phthalic anhydride and a restricted proportion of pyridine substantially less than that which would combine with the carboxyls present in the cellulose ester formed adding trisodium phosphate to the completed reaction mass in an amount sufficient to neutralize the free carboxyl groups of the ester and subsequently separating the ester from the mass by mixing with a precipitating liquid essentially consisting of water and a mineral acid, the precipitating bath being maintained acid throughout the precipitation.

6. A process for the manufacture of a dicarboxylic acid ester of cellulose which comprises reacting upon a cellulose acetate having free and esterifiable groups with a dicarboxylic acid anhydride in which any pyridine present is in an amount substantially less than that which will combine with the carboxyls present in the cellulose ester formed, then adding trisodium phosphate in the form of a 10 per cent aqueous solution thereof to the mass in an amount at least sufficient to neutralize the free carboxyl groups of the ester formed and subsequently separating the ester by mixing the mass with a precipitating liquid essentially consisting of an aqueous solution of a mineral acid, the precipitating bath being acid throughout the precipitation.

CARL J. MALM.
LA MOYNE D. BEARDEN.